US012726580B2

(12) United States Patent
Tian et al.

(10) Patent No.: US 12,726,580 B2
(45) Date of Patent: Sep. 1, 2026

(54) METHOD AND APPARATUS FOR PROCESSING EFFECT VIDEO, ELECTRONIC DEVICE, AND STORAGE MEDIUM

(71) Applicant: Lemon Inc., Grand Cayman, KY (US)

(72) Inventors: Runjia Tian, Los Angeles, CA (US); Peilin Li, Los Angeles, CA (US); Siyao Yang, Los Angeles, CA (US); Weikai Li, Los Angeles, CA (US)

(73) Assignee: Lemon Inc., Grand Cayman (KY)

(*) Notice: Subject to any disclaimer, the term of this patent is extended or adjusted under 35 U.S.C. 154(b) by 105 days.

(21) Appl. No.: 18/832,768

(22) PCT Filed: Jan. 11, 2023

(86) PCT No.: PCT/SG2023/050020
§ 371 (c)(1),
(2) Date: Jul. 24, 2024

(87) PCT Pub. No.: WO2023/140786
PCT Pub. Date: Jul. 27, 2023

(65) Prior Publication Data

US 2025/0113005 A1 Apr. 3, 2025

(30) Foreign Application Priority Data

Jan. 24, 2022 (CN) ......................... 202210080900.6

(51) Int. Cl.
*H04N 5/00* (2011.01)
*H04N 5/222* (2006.01)
*H04N 5/262* (2006.01)

(52) U.S. Cl.
CPC ......... *H04N 5/2224* (2013.01); *H04N 5/2621* (2013.01)

(58) Field of Classification Search
None
See application file for complete search history.

(56) References Cited

U.S. PATENT DOCUMENTS

2014/0123079 A1* 5/2014 Wu ......................... G06F 3/017
715/863
2017/0286567 A1* 10/2017 Hana ..................... B33Y 50/00
(Continued)

FOREIGN PATENT DOCUMENTS

CN 103403650 A 11/2013
CN 106204696 A 12/2016
(Continued)

OTHER PUBLICATIONS

Zhang. "CN 109324749A Translation". Feb. 12, 2019. (Year: 2019).*
(Continued)

*Primary Examiner* — Zhihan Zhou
(74) *Attorney, Agent, or Firm* — Alleman Hall LLP

(57) ABSTRACT

Provided in the embodiments of the present disclosure are a method and apparatus for processing an effect video and an electronic device, and a storage medium. The method comprises: obtaining current position information of a target touch point in response to an effect triggering operation; determining, according to the current position information and a drawing parameter, a two-dimensional trajectory effect consistent with a motion trajectory of the target touch point; and displaying, in response to detecting that a three-dimensional display condition is satisfied, a three-dimensional trajectory effect that corresponds to the two-dimensional trajectory effect from a plurality of angles, and stopping displaying the three-dimensional trajectory effect upon the detection of an instruction to stop playing the effect video being satisfied.

18 Claims, 5 Drawing Sheets

(56) References Cited

U.S. PATENT DOCUMENTS

| | | | | |
|---|---|---|---|---|
| 2018/0081484 | A1* | 3/2018 | Black | G06T 17/00 |
| 2020/0382724 | A1* | 12/2020 | Pena | G06F 3/04883 |
| 2022/0375147 | A1* | 11/2022 | Gao | G06F 3/04845 |
| 2023/0091710 | A1* | 3/2023 | Pan | G06T 19/20 345/156 |
| 2024/0022681 | A1* | 1/2024 | Zhang | H04N 5/265 |
| 2025/0131667 | A1* | 4/2025 | Long | G06T 3/40 |

FOREIGN PATENT DOCUMENTS

| | | | |
|---|---|---|---|
| CN | 106559660 | A | 4/2017 |
| CN | 109324749 | A | 2/2019 |
| CN | 109847360 | A | 6/2019 |
| CN | 109993836 | A | 7/2019 |
| CN | 110533687 | A | 12/2019 |
| CN | 110639204 | A | 1/2020 |
| CN | 111399729 | A | 7/2020 |
| CN | 112035041 | A | 12/2020 |
| CN | 112116690 | A | 12/2020 |
| CN | 112686990 | A | 4/2021 |
| CN | 112929582 | A | 6/2021 |
| CN | 113706709 | A | 11/2021 |
| CN | 113850746 | A | 12/2021 |

OTHER PUBLICATIONS

Huang et al. "CN 113706709A Translation". Nov. 26, 2021. (Year: 2021).*

ISA Intellectual Property Office of Singapore, International Search Report Issued in Application No. PCT/SG2023/050020, Aug. 10, 2023, 5 pages.

China National Intellectual Property Administration, Search Report Issued in Application No. 202210080900.6, Aug. 2, 2023, 2 pages.

Wang, S. "Application of camera 3D technology in AE video special effects," Computer knowledge and skills, Issue 26, Dec. 10, 2015, 10 pages.

"Application of Computer Technology in Video Production," Available online at www.wenmi.com, Apr. 23, 2022, 6 pages.

Lin, C. et al., "Main vertical objects detecting algorithm for real-time 2D-to-3D conversion," Proceedings of the 2012 IEEE 11th International Conference on Signal Processing, Oct. 21-25, 2012, Beijing, China, 4 pages. (Submitted with abstract only).

"The role of the combination of 2D and 3D in animation production," Available online at www.baidu.com; Available as early as 2021, 3 pages. Submitted with English abstract. (Submitted with abstract only).

* cited by examiner

METHOD AND APPARATUS FOR PROCESSING EFFECT VIDEO, ELECTRONIC DEVICE, AND STORAGE MEDIUM

CROSS-REFERENCE TO RELATED APPLICATION(S)

This application is a U.S. National Stage Application of PCT Application Serial No. PCT/SG2023/050020, filed Jan. 11, 2023, which claims the priority to Chinese Patent Application No. 202210080900.6, filed with the Chinese Patent Office on Jan. 24, 2022, the disclosures of which are incorporated herein by reference in their entireties.

FIELD

Examples of the disclosure relate to the technical field of image processing, and relate to, for example, a method and apparatus for processing an effect video, an electronic device, and a storage medium.

BACKGROUND

The development of network technology promotes popularization of application programs (including a series of software that can shoot short videos), which win high popularity.

Software developers develop various effect props for adding the interest of video shooting. However, such effect props of video software are very limited, and richness of a video content needs to be improved. For example, effect videos generated with related effect props in the augmented reality (AR) field have poor effects.

SUMMARY

Examples of the disclosure provide a method and apparatus for processing an effect video, an electronic device, and a storage medium, which satisfy demand of a user for simulation of a process of drawing, with a specific material, a pattern in the real world and enhance richness and interest of an effect video generated.

In a first aspect, the example of the disclosure provides a method for processing an effect video. The method includes:

- obtaining current position information of a target touch point in response to an effect triggering operation;
- determining, according to the current position information and a drawing parameter, a two-dimensional trajectory effect consistent with a motion trajectory of the target touch point; and
- displaying, in response to detecting that a three-dimensional display condition is satisfied, a three-dimensional trajectory effect that corresponds to the two-dimensional trajectory effect from a plurality of angles, and stopping displaying the three-dimensional trajectory effect upon the detection of an instruction to stop playing the effect video being satisfied.

In a second aspect, the example of the disclosure further provides an apparatus for processing an effect video. The apparatus includes:

- a position information determination module configured to obtain current position information of a target touch point in response to an effect triggering operation;
- a two-dimensional trajectory determination module configured to determine, according to the current position information and a drawing parameter, a two-dimensional trajectory effect consistent with a motion trajectory of the target touch point, where the drawing parameter includes sugar painting drawing material; and
- a video display module configured to display, in response to detecting that a three-dimensional display condition is satisfied, a three-dimensional trajectory effect that corresponds to the two-dimensional trajectory effect from a plurality of angles, and stop displaying the three-dimensional trajectory effect upon the detection of an instruction to stop playing the effect video being satisfied.

In a third aspect, the example of the disclosure further provides an electronic device. The electronic device includes:

- a processor; and
- a storage apparatus configured to store a program, where the processor implements the method for processing an effect video according to any example of the disclosure when the program is executed by the processor.

In a fourth aspect, the example of the disclosure further provides a storage medium. The storage medium includes a computer-executable instruction, where the computer-executable instruction is configured to execute the method for processing an effect video according to any example of the disclosure when executed by a computer processor.

BRIEF DESCRIPTION OF THE DRAWINGS

Throughout the accompanying drawings, the same or similar reference numerals indicate the same or similar elements. It should be understood that the accompanying drawings are illustrative and components and elements are not necessarily drawn to scale.

DETAILED DESCRIPTION OF EMBODIMENTS

Examples of the disclosure will be described below with reference to accompanying drawings. Although some examples of the disclosure are shown in the accompanying drawings, it should be understood that the disclosure can be implemented in various forms and should not be constructed as limited to the examples set forth herein. It should be understood that the accompanying drawings and the examples of the disclosure are merely illustrative.

It should be understood that steps described in a method embodiment of the disclosure can be executed in different orders and/or in parallel. Further, the method embodiment can include an additional step and/or omit a shown step.

As used herein, the terms "comprise" and "include" and their variations are open-ended, that is, "comprise but not limited to" and "include but not limited to". The term "based on" indicates "at least partially based on". The term "an example" indicates "at least one example". The term "another example" indicates "at least one another example". The term "some examples" indicates "at least some examples". Related definitions of other terms will be given in the following description.

It should be noted that concepts such as "first" and "second" mentioned in the disclosure are merely used to distinguish different apparatuses, modules or units, rather than limit an order or interdependence of functions executed by these apparatuses, modules or units.

It should be noted that modifications with "a", "an" and "a plurality of" mentioned in the disclosure are illustrative, and should be understood by those skilled in the art as "one or more" unless otherwise definitely indicated in the context.

Before introducing a technical solution, an application scenario can be illustratively described at first. The technical solution of the disclosure may be applied to a scenario where an effect video needs to be generated. For example, a corresponding pattern may be generated in a display interface based on a drawing operation of a user in a process of shooting a video through a related application program, and then an effect video that includes a three-dimensional model corresponding to the pattern may be generated and displayed in the display interface.

Example 1

Figure 1:
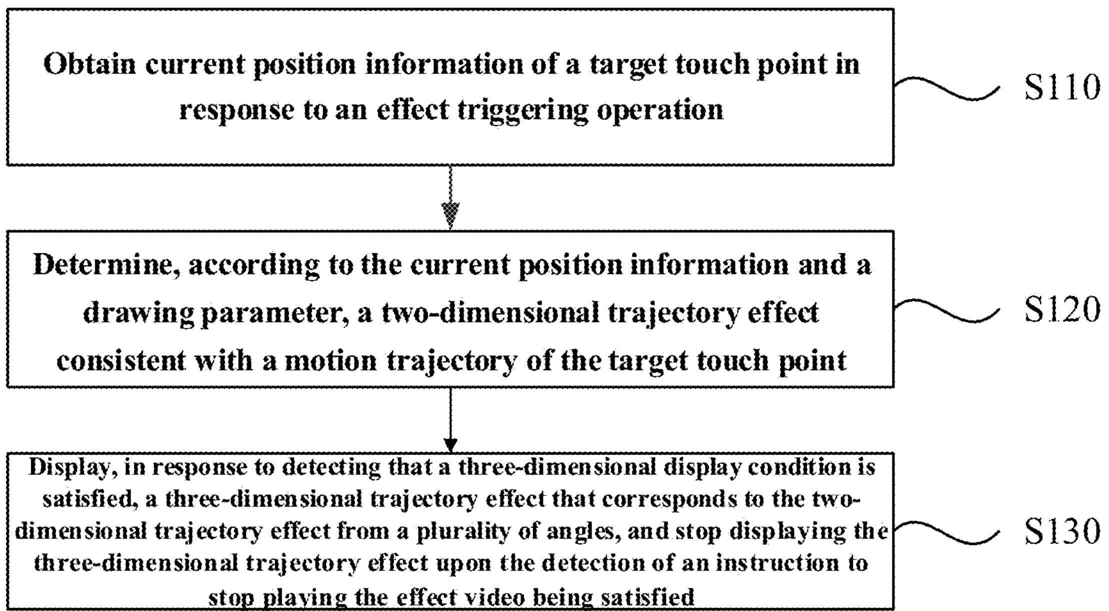
FIG. 1 is an illustrative flowchart of a method for processing an effect video according to Example 1 of the disclosure.

FIG. 1 is an illustrative flowchart of a method for processing an effect video according to Example 1 of the disclosure. This example may be applied to the case that a user draws an image with a specific material by using effect props and generates a corresponding effect video based on the image drawn. This method may be implemented by an apparatus for processing an effect video. The apparatus may be implemented in the form of software and/or hardware, and the hardware may be an electronic device, such as a mobile terminal, a personal computer (PC) terminal or a server. The scenario of effect video display is usually implemented through cooperation between a client and the server. The method provided in this example may be executed by the server, the client or the client cooperating with the server.

As shown in FIG. 1, the method according to this example include:

S110. Current position information of a target touch point is obtained in response to an effect triggering operation.

The apparatus for executing the method for processing an effect video according to the example of the disclosure may be integrated in application software supporting an effect video processing function. The software may be mounted in the electronic device. Optionally, the electronic device may be the mobile terminal, the PC terminal, etc. The application software may be software of one type that processes the image or video, as long as the image or video can be processed. The application software may also be a specially developed application program that is in software for adding and displaying an effect or is integrated in a corresponding page. The user can process the effect video through the page integrated in the PC terminal.

In this example, in the application software or application program that supports the effect video processing function, a control for triggering the effect may be developed in advance. When it is detected that the user triggers the control, a response to an effect triggering operation may be given, and current position information of a target touch point is obtained accordingly.

The effect triggered may be an interactive effect. For example, when the user performs a triggering operation on a specific control and activates a corresponding painting effect, an effect image of any shape can be drawn in a relevant display interface with a specific material (for example, a simulation of a sugar painting material or an ink material from the real world) based on a mobile terminal currently held. After the effect image is drawn, relevant data can generate an effect video corresponding to the image drawn by the user after being processed by the application software or application program.

Based on that, it can be understood that the target touch point may be a drawing point that is determined in the display interface after the user triggers one effect in the application software, and used for drawing an effect image. The target point may also be a key point associated with a feature of the user. The current position information of the target touch point refer to data (for example, two-dimensional coordinates of the target touch point in the display interface) that are determined by the application software or application program for a position, in the display interface, of the target touch point.

Optionally, for the effect triggered, the user may use a facial feature (such as a nose) to determine a position as a drawing point of a "drawing pen" in the display interface. In a subsequent process, the user may also control the drawing point to move in the display interface based on the facial feature, so as to draw an effect image in a specific material. Alternatively, the user may determine a position of a drawing point in the display interface through a touch operation of a finger on a display apparatus, and then draw an effect image in a specific material through motion of the finger in a subsequent process.

In this example, the user may trigger the target touch point in the display interface in various ways. In view of that, a current image acquisition mode may be determined before the current position information of the target touch point is obtained, so as to determine the current position information of the target touch point according to the current image acquisition mode.

The image acquisition mode of the mobile terminal held by the user may include a front-facing acquisition mode based on a front-facing camera apparatus and a rear-facing acquisition mode based on a rear-facing camera apparatus. Correspondingly, when it is determined that the current image acquisition mode is the front-facing acquisition mode, the user may trigger the target touch point in the display interface based on a facial feature. That is, the application software or application program may determine a target touch point corresponding to a facial feature (such as a nose of the user) in the display interface when a front-facing camera acquires a face image of the user, and then determine a position of the target touch point in the display interface. When it is determined that the current image acquisition mode is the rear-facing acquisition mode, the user may trigger the target touch point in the display interface through finger touch. That is to say, the application program merely acquires an image at a current moment through a rear-facing camera, determines a corresponding target touch point based on a touch operation of the finger of the user, and thus determines the position of the target touch point in the display interface.

The two ways to determine the current position information of the target touch point are described respectively.

Optionally, if the current image acquisition mode is the front-facing acquisition mode, current position information, in the display interface, of a target key point in the face image is determined in the process of obtaining the current position information of the target touch point when it is detected that the face image is included in the display interface. Illustratively, the nose of the user is preset as the target key point. Based on this, when the user acquires the face image through the front-facing camera of a mobile device, the feature in the face image may be recognized based on a pre-trained face recognition algorithm. When the feature of the nose that may be used as the target key point is recognized from the face image, coordinates of the feature in the display interface may be used as the current position information. Motion information of the nose of the nose may be detected by the front-facing camera, then the target touch point may be controlled to move in the display interface, and finally a pattern corresponding to a motion trajectory of the target touch point is drawn.

Optionally, if the current image acquisition mode is the rear-facing acquisition mode, position information of a pressing point on a display interface is taken as the current position information and the pressing point is taken as the target touch point in the process of obtaining the current position information of the target touch point. Illustratively, when the user shoots any picture through the rear-facing camera of the mobile device, a pressing operation of the finger of the user on a touch screen of the mobile terminal may be detected. After such an operation is detected, coordinates of a pressing point determined in the display interface may be used as the current position information. Based on pressing force generated by the finger of the user on the touch screen, the target touch point in the display interface may be caused to move along with the motion of the finger of the user, and finally the pattern corresponding to the motion trajectory of the target touch point is drawn.

In this example, when the user draws a corresponding image with a specific material, a trajectory template for assisting in drawing may be provided for the user in advance before the current position information of the target touch point is obtained in order to enhance interest of a drawing process and reduce a learning cost of an effect prop.

Optionally, after the user selects one effect, at least one trajectory template to be selected may be displayed. A trajectory template to be selected that is last triggered within preset duration is taken as a target trajectory template. A guide diagram that corresponds to the target trajectory template is displayed on the display interface, and the target touch point is caused to draw, based on the guide diagram, a two-dimensional trajectory effect.

Figure 2:
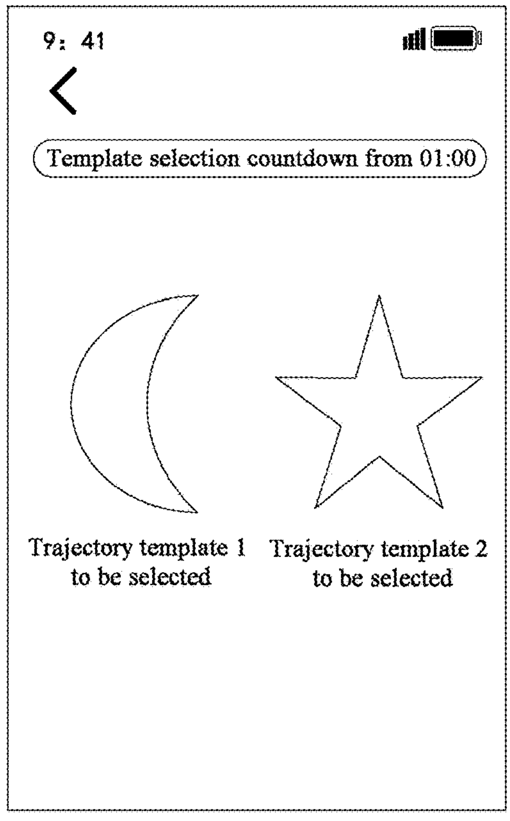
FIG. 2 is an illustrative diagram of showing a plurality of trajectory templates to be selected in a display interface according to Example 1 of the disclosure.

There may be one or more trajectory templates to be selected, and each trajectory template to be selected may present a display effect of a pattern associated. As shown in FIG. 2, when the user triggers one effect, the application program may display a trajectory template 1 to be selected corresponding to a moon pattern and a trajectory template 2 to be selected corresponding to a star pattern in the relevant display interface. In this example, the user is provided with the trajectory template to be selected associated with the effect, and template selection countdown is also displayed in the display interface. The countdown time is preset selection duration. It can be understood that the user may perform selection from a plurality of trajectory templates to be selected through the triggering operation. When the selection lasts for the preset duration, that is, the template selection countdown returns to zero, the trajectory template to be selected that is selected by the user at this moment is the target trajectory template. It is clear that before the preset duration is reached, the user may also issue a confirmation instruction through a confirmation control. Thus, a countdown process of template selection is directly ended, and the currently selected trajectory template to be selected is taken as the target trajectory template. It should be understood by those skilled in the art that on one hand, when there are a plurality of trajectory templates to be selected, the user may select the plurality of templates in turn at discretion thereof, and the application program will merely take the trajectory template to be selected that is last selected by the user as the target trajectory template after selection time reaches the preset duration; and on another hand, the way to determine the target trajectory template may be selected according to actual situations.

When the target trajectory template is determined, the display interface may also display a guide diagram corresponding to the target trajectory template. The guide diagram refers to a dotted line with arrows for guiding the user to draw a related image. In the process of displaying the guide diagram, a drawing path of the target trajectory template may be determined at first, the guide diagram is generated according to the drawing path, and the guide diagram is displayed on the display interface.

Figure 3:
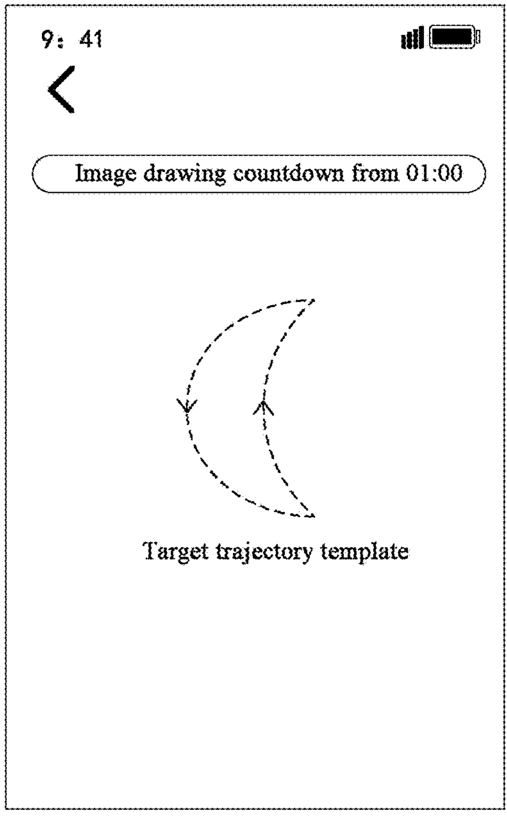
FIG. 3 is an illustrative diagram of showing a guide diagram corresponding to a target trajectory template in the display interface according to Example 1 of the disclosure.

As shown in FIG. 3, after the user selects the trajectory template 1 to be selected including the moon pattern as the target trajectory template, a drawing path corresponding to the moon may be determined at first. According to the drawing path, a dotted line diagram corresponding to the moon pattern may be displayed in the display interface as a guide diagram. Besides, arrows for indicating a drawing direction are also displayed on the guide diagram. It can be understood based on this that the guide diagram may assist the user in drawing the moon pattern in a subsequent process. In the subsequent drawing process, the user controls the target touch point to move in the direction of the arrows on the guide diagram, so as to draw, in the display interface, an outline or planar structure of a two-dimensional image reflected by the target trajectory template.

It should be noted that in this example, a backstop strategy is also pre-deployed for the case that the user does not make selection. For example, if at least one trajectory template to be selected is not triggered within the preset duration, a default trajectory template is taken as the target trajectory template. The default trajectory template includes a preset trajectory template or a blank trajectory template. It can be understood that when a trajectory template is pre-imported into the application program as the preset trajectory template, a guide diagram corresponding to the default trajectory template will be displayed in the display interface if the user does not select any trajectory template to be selected within the preset duration. When the blank trajectory template that includes no substantial content is pre-imported into the application program as the preset trajectory template, an image drawing page that includes no guide diagram will be displayed in the display interface if the user does not select any trajectory template to be selected within the preset duration. In this case, the user may draw an image of any shape on the image drawing page at discretion of the user.

It should also be noted that even after the target trajectory template is determined in the application program, a line drawn may deviate from the guide diagram when the user later controls the target touch point to draw a pattern. In this case, the application program may either finalize the pattern drawn by the user or optimize, with a pre-deployed and trained image processing algorithm, the pattern drawn by the user, for example, smoothing on relevant lines in the image.

In an actual application process, after the current position information of the target touch point is determined, an effect drawing pen may be added to the target touch point, and the two-dimensional trajectory effect is drawn based on the effect drawing pen.

The effect drawing pen may be a virtual object that is related to a current effect and bound to the target touch point in the display interface. It can be understood that in the subsequent process, the effect drawing pen in the display interface may move along with the target touch point. For example, if the current effect is a sugar painting effect, a sugar spoon pattern may be set as the effect drawing pen. When the user draws an image in the subsequent process, the sugar spoon pattern may move along with the target touch point. In the actual application process, when the user selects the sugar painting effect, the sugar spoon may move along with the target touch point, leave syrup on a motion trajectory, and finally generate a virtual sugar painting. Thus, the process of making a sugar painting in the real world is simulated.

In this example, by adding the effect drawing pen, the interest of the effect is enhanced. In addition, the visual effect drawing pen can also show the user an actual position of the target touch point at all times during the image drawing process, and indirectly make the image drawn more fit a trajectory in the target trajectory template. It should be understood by those skilled in the art that besides the sugar spoon in the above example, the effect drawing pen may also be in a variety of simulacrum patterns, for example, a virtual drawing pen that is common among various effects. It can be understood that a shape and a style of the effect drawing pen may be adjusted according to demand of the effects.

S120. According to the current position information and a drawing parameter, a two-dimensional trajectory effect consistent with a motion trajectory of the target touch point is determined.

The drawing parameter refers to attribute information corresponding to a material simulated by the current effect. The drawing parameter can be understood as a parameter that determines the material of the pattern drawn by the user in the display interface. For example, when the current effect is the sugar painting effect, the drawing parameter is a parameter for presenting the image in the sugar painting drawing material. When the current effect is an ink painting effect, the drawing parameter is a parameter for presenting the image in an ink material.

In this example, after the current position information of the target touch point and the drawing parameter are determined, a corresponding two-dimensional trajectory effect may be drawn in the display interface according to the motion trajectory of the target touch point. The two-dimensional trajectory effect is a final image drawn by the user, and may at least reflect the motion trajectory of the target touch point in the display interface.

Illustratively, a process of drawing the two-dimensional trajectory effects may be as follows: under the condition of detecting that the target touch point moves based on the guide diagram, the two-dimensional trajectory effect is drawn by taking the current position information as a drawing start point and using the sugar painting drawing material as a drawing material. With FIG. 3 as an example, when it is detected that the target touch point moves along the guide diagram corresponding to the moon pattern, a current position of the target touch point may be taken as the drawing start point. In addition, the sugar painting drawing material corresponding to the sugar painting effect is determined based on the drawing parameter. It can be understood that the moon pattern drawn with the sugar painting drawing material may present a visual effect similar to that of a real sugar painting. For example, the pattern drawn presents a color and luster similar to those of the real sugar painting. When the target touch point in the display interface moves under control by the user, the moon pattern in the sugar painting drawing material may be generated. The pattern is the two-dimensional trajectory effect corresponding to a target trajectory image.

In an actual process of drawing the sugar painting, a size of a point and a thickness of a line generated in the sugar painting may vary as an amount of syrup dropped from the sugar spoon varies. Thus, in this example, in order to make the effect image drawn by the user closer to a real effect, a process of drawing the two-dimensional trajectory effect may also be as follows: a motion pause point of the target touch point is determined during motion of the target touch point; an attribute of a trajectory between two adjacent motion pause points is determined according to pause point attributes of the two adjacent motion pause points; the two-dimensional trajectory effect is determined based on trajectory width information, a sugar color attribute and the motion trajectory.

In this example, when drawing the pattern based on the guide diagram, the user needs to draw one by one line segments in the pattern. When the target touch point passes through a connection point between the lines in the pattern, an operation pause exists inevitably. Thus, the motion pause point may be a turning point in the pattern drawn. Those skilled in the art should understand that the motion pause point is not limited to the turning point in the pattern, but also may appear in the lines of the pattern. That is to say, besides the turning point in the pattern, if the user pauses when drawing a single line, a corresponding target touch point will also pause in the display interface, and a corresponding pause point may also be determined as the motion pause point. It can be understood that whether a point on the pattern is a motion pause point is essentially determined by a pause of the user in the drawing process.

In this example, when the effect is the sugar painting effect, the pause point attribute serves as information that reflects the pause of the operation of the user, as well as information that determines a final visual effect of the sugar painting pattern. For example, the pause point attribute includes pause duration, that is, duration when the target touch point stays at the pause point, as recorded by the application program. The attribute information of the trajectory includes the trajectory width information and the sugar color attribute. The trajectory width information refers to information that reflects widths of the lines in the pattern, and the sugar color attribute refers to information that reflects thicknesses, luster and textures of the lines in the sugar painting generated.

When the pause point attributes of the two adjacent motion pause points are determined in the process of motion of the target touch point, the attribute of the trajectory between the two points may be determined, and then the two-dimensional trajectory effect is obtained. For example, pause duration of a current pause point is determined, and trajectory width information and a sugar color attribute of the current pause point are determined. According to displacement information and motion duration information from the current pause point to a next pause point, trajectory width information, sugar color depth information, sugar color brightness information and a sugar material thickness between the current pause point and the next pause point are determined as the trajectory attributes. This process will be described with FIG. 3 as an example below.

With reference to FIG. 3, when an upper turning point and a lower turning point of the moon are determined as motion pause points, pause duration of the above two motion pause points may be recorded during the process of drawing the patterns by the user. It can be understood that for any motion pause point, the longer the corresponding pause duration is, the larger a point drawn in the display interface is, and the shorter the corresponding pause duration is, the smaller a point drawn in the display interface is. In addition, in order to simulate a process of drawing a sugar painting in the real world, it is necessary to determine width information (that is, the trajectory width information) and the sugar color attribute of the pattern line. It can be understood that the faster the target touch point moves from the upper turning point of the moon to the lower turning point of the moon, the narrower a width of a corresponding line is, and the smaller a color depth and a brightness of the sugar color and a thickness of the sugar material are. The more slowly the target touch point moves from the upper turning point of the moon to the lower turning point of the moon, the wider a width of a corresponding line is, and the greater a color depth and a brightness of the sugar color and a thickness of the sugar material are.

In this example, by determining the trajectory attribute in the process of drawing the pattern, the final sugar painting is closer to the sugar painting in the real world, and realism of a final virtual sugar painting is enhanced.

S130. In response to detecting that a three-dimensional display condition is satisfied, a three-dimensional trajectory effect that corresponds to the two-dimensional trajectory effect is displayed from a plurality of angles, and the three-dimensional trajectory effect is kept displayed until an instruction to stop playing the effect video is detected.

The three-dimensional trajectory effect refers to dynamic display of a plurality of frames of the three-dimensional model from the plurality of angles after a corresponding three-dimensional model is obtained by processing the two-dimensional trajectory effect. For example, after the two-dimensional trajectory effect corresponding to the moon pattern is drawn, the application software may generate a corresponding three-dimensional (3D) model based on a two-dimensional moon pattern. When the three-dimensional trajectory effect is displayed to the user, the 3D model corresponding to the moon pattern in the effect video may present a visual effect of constantly rotating in the display interface. Thus, multi-angle pictures of the model are displayed from the plurality of angles.

In this example, in the process of drawing the corresponding sugar painting drawing based on the target touch point and the guide diagram, the three-dimensional display condition may also be detected in real time. The three-dimensional display condition refers to a triggering condition for displaying, in an augmented reality (AR) scenario in three dimensions, the two-dimensional trajectory effect drawn. For example, an event detected that drawing of the two-dimensional trajectory effect is completed may be used as the three-dimensional display condition. It can be understood that after it is detected that drawing of a corresponding two-dimensional trajectory effect is completed by the user, a three-dimensional (3D) model corresponding to the two-dimensional trajectory effect is automatically built in a three-dimensional space based on a pre-written program, and then a corresponding effect video is generated based on the 3D model. Alternatively, data corresponding to the two-dimensional trajectory effect determined are uploaded to a server, the 3D model corresponding to the two-dimensional trajectory effect and a corresponding effect video are built by using a computation resource of the server, and finally data related to the effect video are sent to the client. Thus, the three-dimensional trajectory effect may be displayed in the display interface.

In this example, in order to prevent the condition that the three-dimensional trajectory effect is displayed on the display interface all the time and affects use experience of the user, it is necessary to detect an instruction to stop playing the effect video during display of the three-dimensional trajectory effect. There is a variety of instructions to stop playing the effect video. For example, when it is detected that the three-dimensional trajectory effects is displayed for preset duration, the instruction to stop playing the effect video may be automatically generated. Alternatively, when it is detected that the user triggers a play stop control or exits an application control, the instruction to stop playing the effect video may be generated based on a related control. When the instruction to stop playing is detected, the three-dimensional trajectory effect is stopped from being displayed in the display interface.

According to the technical solution of this example, the current position information of the target touch point is obtained in response to the effect triggering operation, that is, a position of the touch point corresponding to the effect prop is determined when the user uses the effect prop. According to the current position information and the drawing parameter, the two-dimensional trajectory effect consistent with the motion trajectory of the target touch point is determined, that is, the effect material corresponding to the effect prop is determined, and the corresponding two-dimensional effect is drawn based on the motion trajectory of the touch point. In response to detecting that the three-dimensional display condition is satisfied, the three-dimensional trajectory effect that corresponds to the two-dimensional trajectory effect is displayed from the plurality of angles, and the three-dimensional trajectory effect is kept displayed until the instruction to stop playing the effect video is detected. In the process of generating the effect video, the prop for drawing the trajectory effect based on the specific material is provided for the user, the demand from the user for simulating the process of drawing the pattern with the specific material in the real world is satisfied, the use experience of the user is improved, and richness and interest of the effect video generated are enhanced.

Example 2

Figure 4:
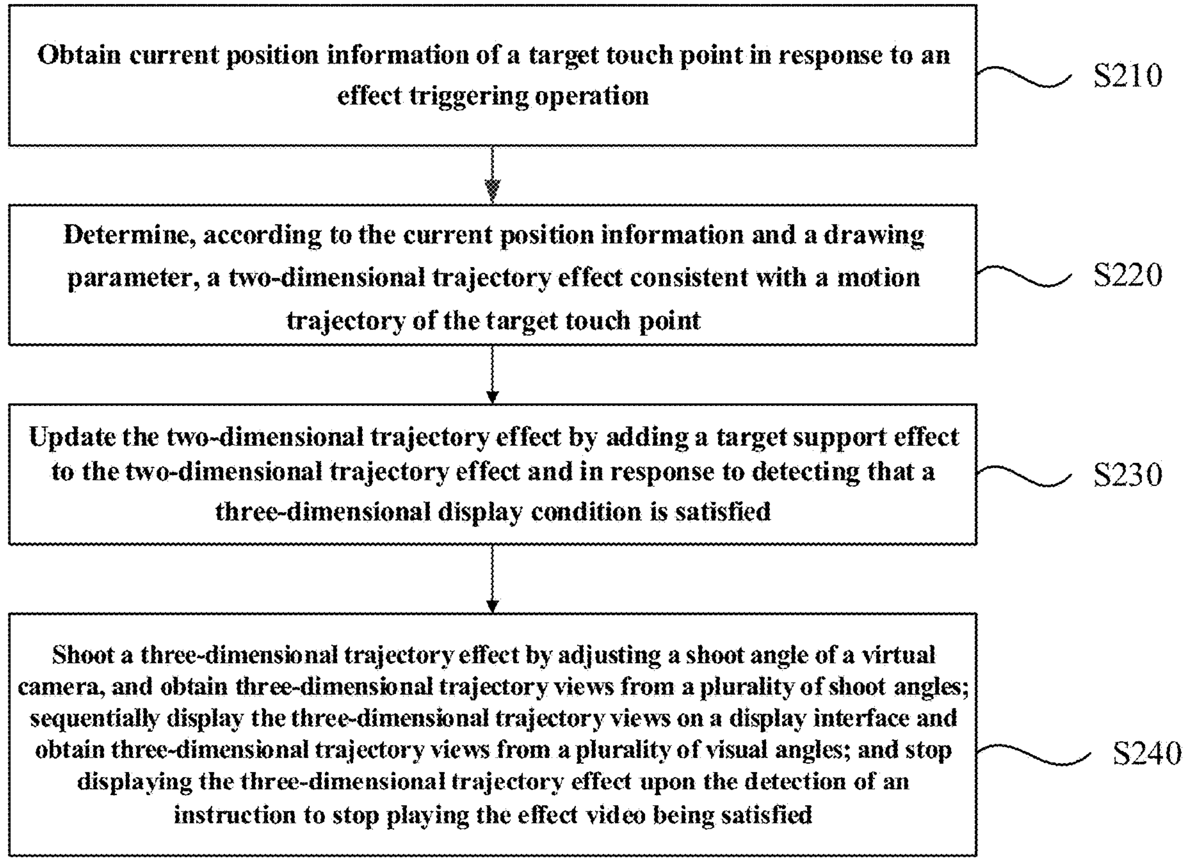
FIG. 4 is an illustrative flowchart of a method for processing an effect video according to Example 2 of the disclosure.

FIG. 4 is an illustrative flowchart of a method for processing an effect video according to Example 2 of the disclosure. On the basis of the above example, when it is detected that a three-dimensional display condition is satisfied, data of an entry layer are displayed and data of a non-entry layer are deleted, thus reducing occupation of a cache space. A target support effect is added to a two-dimensional trajectory effect and a festival effect is superimposed onto a target area of a display interface, thus enriching a content of the effect video and enhancing interest of the effect video. Technical terms that are the same as or corresponding to those in the above example are not repeated herein.

As shown in FIG. 4, the method may include:

S210. Current position information of a target touch point is obtained in response to an effect triggering operation.

S220. According to the current position information and a drawing parameter, a two-dimensional trajectory effect consistent with a motion trajectory of the target touch point is determined.

It should be noted that in application software or an application program related to effect video processing, the entry layer and the non-entry layer may be divided according to a stage of data. The data in the non-entry layer are data that may not be used in a display stage, for example, a plurality of trajectory templates to be selected associated with a current effect, and guide diagrams corresponding to the trajectory templates to be selected. Correspondingly, the data in the entry layer are data used in the display stage, for example, data related to a pattern drawn by a user and a three-dimensional trajectory effect generated finally.

In a process of drawing the two-dimensional trajectory effect based on the target touch point and the guide diagram, the guide diagram is displayed on the non-entry layer, the two-dimensional trajectory effect drawn is displayed on the entry layer, and the two-dimensional trajectory effect is displayed and the guide diagram is deleted under the condition of detecting that the three-dimensional display condition is satisfied.

Illustratively, when the user determines a trajectory template to be selected corresponding to a moon pattern as a target trajectory template, a guide diagram that corresponds to the target trajectory template and is displayed on the display interface belongs to the data of the non-entry layer. When the user controls the target touch point to draw the pattern in the display interface, the two-dimensional trajectory effect generated belongs to the data of the entry layer. Based on this, when the effect video needs to be displayed in a subsequent process, merely the data corresponding to the two-dimensional trajectory effects may be displayed, and the data (that is, the guide diagram corresponding to the moon pattern) in the non-entry layer may be simultaneously deleted, thus reducing the occupation of the cache space.

S230. The two-dimensional trajectory effect is updated by adding the target support effect to the two-dimensional trajectory effect in response to detecting that the three-dimensional display condition is satisfied.

It should be noted that in the actual application process, the three-dimensional display condition includes at least one of the following: duration of drawing the two-dimensional trajectory effect reaches preset drawing duration; completion of drawing of the two-dimensional trajectory effect is detected; and actual stay duration at a pause point reaches a preset stay duration threshold during drawing of the two-dimensional trajectory effect.

With FIG. 3 as an example, when the user controls the target touch point to draw the moon pattern in the display interface based on the guide diagram, one-minute countdown for image drawing may be displayed at a top of the interface. This time refers to the preset drawing duration. It can be understood that when actual drawing duration reaches this duration, the application stops responding to the drawing operation based on the target touch point regardless of whether drawing of the pattern is completed, and then the three-dimensional trajectory effect corresponding to the two-dimensional trajectory effect is displayed in the display interface. Optionally, when the user draws the moon pattern in the display interface based on the target touch point, the two-dimensional trajectory effect generated by drawing is detected based on a preset time interval. When it is detected that the drawing of the two-dimensional trajectory effect is completed, that is, a line corresponding to the moon pattern is closed, the responding to the drawing operation based on the target touch point is stopped, and then the three-dimensional trajectory effect corresponding to the two-dimensional trajectory effect is displayed in the display interface. Optionally, when the user draws the moon pattern in the display interface based on the target touch point, pause duration of pause points in the drawing process is recorded. When the pause duration of any pause point exceeds the preset stay duration threshold, the responding to the drawing operation based on the target touch point is stopped, and then the three-dimensional trajectory effect corresponding to the two-dimensional trajectory effect is displayed in the display interface. It should be understood by those skilled in the art that the above display conditions may take effect in the application software at the same time, or merely one or more of the display conditions may be selected to take effect in the application software.

It should be noted that when the above three-dimensional display conditions are satisfied, if the user still not completes drawing of the pattern, a three-dimensional trajectory effect corresponding to the two-dimensional trajectory effect that is not completed may be displayed in the display interface according to the solution of this example. Alternatively, the guide diagram corresponding to the target trajectory template may be re-displayed in the display interface to guide the user through redrawing of the two-dimensional trajectory effect.

In this example, in order to enrich a visual effect presented by the three-dimensional trajectory effect that finally generated, it is necessary to update the three-dimensional trajectory effect by adding a target support effect when it is detected that the three-dimensional display condition is satisfied. The target support effects may be a new pattern added onto the two-dimensional trajectory effect, and in a finally presented view, the target support effect is at least used for bearing the three-dimensional trajectory effect generated.

With FIG. 5 as an example, when the current effect is a sugar painting effect and the two-dimensional trajectory effect of the moon pattern is obtained, a target support effect in a small wooden stick style may be added below the effect. The small wooden stick as the target support effect is combined with the two-dimensional trajectory effect corresponding to the moon pattern, so as to update the two-dimensional trajectory effect. It can be understood that in an effect video made subsequently, the little wooden stick may be displayed rotatably in the display interface along with the 3D model corresponding to the moon pattern. In this way, a final sugar painting model of the moon pattern may be closer to reality.

Optionally, after the two-dimensional trajectory effect is obtained, a festival effect may also be superimposed in a target area of the display interface. The target area refers to an area for displaying three-dimensional trajectory effect. The festival effect refers to static effects and/or dynamic effects related to various festivals developed in advance. With FIG. 5 as an example, after the sugar painting effect is selected and the two-dimensional trajectory effect corresponding to the moon pattern is obtained, the application may also determine a festival "Spring Festival" closest to a current moment based on system time. Couplets and horizontal scrolls bearing inscriptions that are related to festival effects of the Spring Festival are retrieved. The couplet marked with relevant text information is displayed in the target area. In addition, a logo "sugar painting" of the current effect may be adaptively displayed on the horizontal scroll bearing an inscription.

By superimposing the festival effect in the display interface, the content of the effect video is enriched and the interest of the effect video is enhanced.

S240. A three-dimensional trajectory effect is shot by adjusting a shoot angle of a virtual camera, and three-dimensional trajectory views are obtained from a plurality of shoot angles. The three-dimensional trajectory views are sequentially displayed on a display interface and three-dimensional trajectory views are obtained from a plurality of visual angles. The three-dimensional trajectory effect is kept displayed until an instruction to stop playing the effect video is detected.

In this example, there are a plurality of virtual cameras in an AR scenario constructed by the application. These virtual cameras are at least used to shoot the three-dimensional trajectory effect from a plurality of angles, so as to obtain a corresponding three-dimensional trajectory view. These views are displayed frame by frame in the display interface. It can be understood that the virtual cameras in the AR scenario may get a multi-frame three-dimensional trajectory view by rotatably shoot the three-dimensional trajectory effect in the AR scene. The three-dimensional trajectory effect is determined based on data of the two-dimensional trajectory effect.

Figure 5:
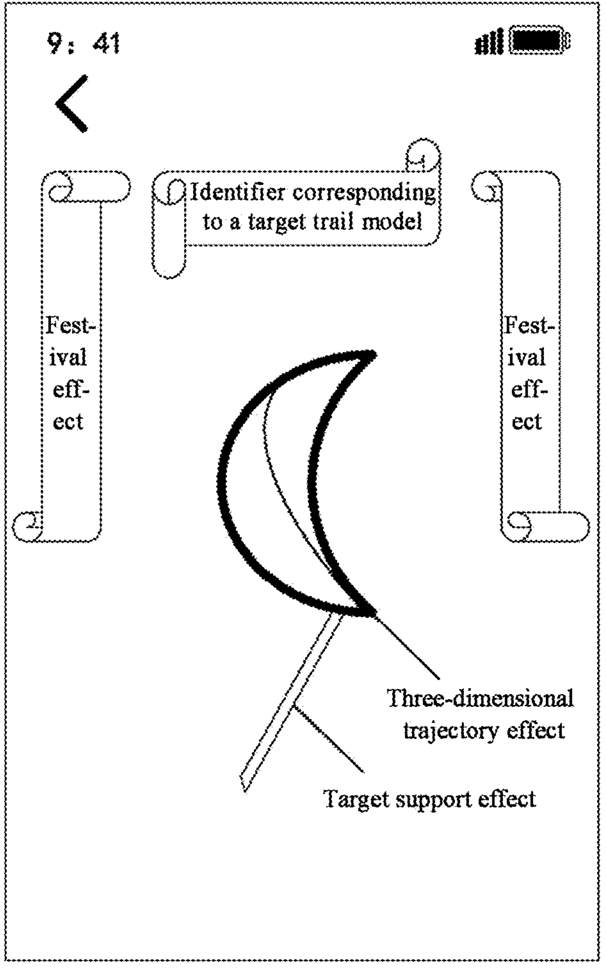
FIG. 5 is an illustrative diagram of showing a sugar painting effect video in a display interface according to Example 2 of the disclosure.

With FIG. 5 as an example, after the three-dimensional trajectory effect corresponding to the moon pattern is determined, the effect may be shot based on the plurality of virtual cameras in the scenario, so as to obtain the corresponding three-dimensional trajectory view. In the display process, the three-dimensional trajectory view is displayed frame by frame, such that the three-dimensional trajectory effect corresponding to the moon pattern is rotatably displayed in the interface. It can be understood that in the process of rotatable display, the user may observe the three-dimensional trajectory effect corresponding to the moon pattern from the plurality of visual angles.

According to the technical solution of this example, when it is detected that the three-dimensional display condition is satisfied, the data of the entry layer are displayed and the data of the non-entry layer are deleted, thus reducing occupation of the cache space. The target support effect is added to the two-dimensional trajectory effect and the festival effect is superimposed onto the target area of the display interface, thus enriching the content of the effect video and enhancing the interest of the effect video.

Example 3

Figure 6:
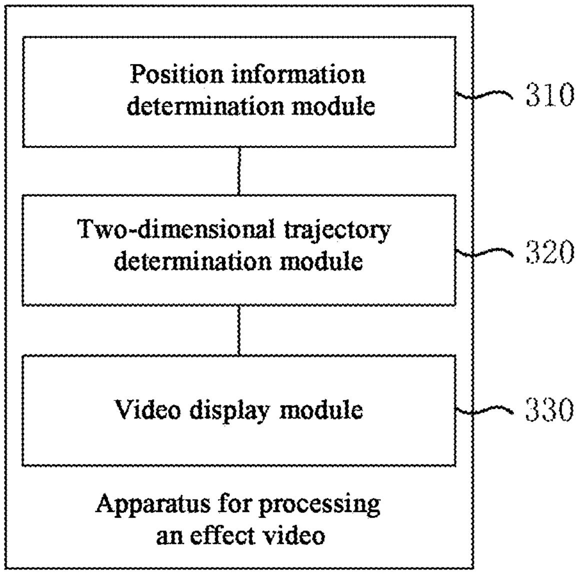
FIG. 6 is a structural block diagram of an apparatus for processing an effect video according to Example 3 of the disclosure.

FIG. 6 is a structural block diagram of an apparatus for processing an effect video according to Example 3 of the disclosure. The apparatus may execute the method for processing an effect video according to any example of the disclosure, and has corresponding functional modules and beneficial effects for executing the method. As shown in FIG. 6, the apparatus includes a position information determination module 310, a two-dimensional trajectory determination module 320 and a video display module 330.

The position information determination module 310 is configured to obtain current position information of a target touch point in response to an effect triggering operation.

The two-dimensional trajectory determination module 320 is configured to determine, according to the current position information and a drawing parameter, a two-dimensional trajectory effect consistent with a motion trajectory of the target touch point.

The video display module 330 is configured to display, in response to detecting that a three-dimensional display condition is satisfied, a three-dimensional trajectory effect that corresponds to the two-dimensional trajectory effect from a plurality of angles, and stop displaying the three-dimensional trajectory effect upon the detection of an instruction to stop playing the effect video being satisfied.

Based on the technical solutions above, the apparatus for processing an effect video further includes an image acquisition mode determination module.

The image acquisition mode determination module is configured to determine a current image acquisition mode, and determine the current position information of the target touch point according to the current image acquisition mode.

Based on the technical solutions above, the apparatus for processing an effect video further includes a target trajectory template determination module.

The target trajectory template determination module is configured to display at least one trajectory template to be selected, take a trajectory template to be selected that is last triggered within preset duration as a target trajectory template, display a guide diagram that corresponds to the target trajectory template on a display interface, and cause the target touch point to draw, based on the guide diagram, the two-dimensional trajectory effect; and alternatively, take a default trajectory template as a target trajectory template in response to failing to trigger the at least one trajectory template to be selected within preset duration, where the default trajectory template includes a preset trajectory template or a blank trajectory template.

Optionally, the target trajectory template determination module is configured to generate and display the guide diagram by a method as follows: a drawing path of the target trajectory template is determined, the guide diagram is generated according to the drawing path, and the guide diagram is displayed on the display interface.

Optionally, if the current image acquisition mode includes a front-facing acquisition mode, the position information determination module 310 is configured to determine the current position information of the target touch point by a method as follows: the current position information in the display interface of a target key point of a face image is determined when it is detected that the face image is included in the display interface.

Optionally, if the current image acquisition mode includes a rear-facing acquisition mode, the position information determination module 310 is configured to determine the current position information of the target touch point by a method as follows: position information of a pressing point on the display interface is taken as the current position information and the pressing point is taken as the target touch point.

Based on the technical solutions above, the apparatus for processing an effect video further includes an effect drawing pen generation module.

The effect drawing pen generation module is configured to add an effect drawing pen to the target touch point, and draw the two-dimensional trajectory effect based on the effect drawing pen.

Optionally, the two-dimensional trajectory determination module 320 is configured to draw the two-dimensional trajectory: under the condition of detecting that the target touch point moves based on the guide diagram, draw the two-dimensional trajectory effect by taking the current position information as a drawing start point and using a sugar painting drawing material as a drawing material.

Based on the technical solutions above, the two-dimensional trajectory determination module 320 includes a motion pause point determination unit, a trajectory attribute determination unit and a two-dimensional trajectory effect determination unit.

The motion pause point determination unit is configured to determine a motion pause point of the target touch point during motion of the target touch point.

The trajectory attribute determination unit is configured to determine an attribute of a trajectory between two adjacent motion pause points according to pause point attributes of the two adjacent motion pause points, where the pause point attribute includes pause duration, and the attribute of the trajectory includes trajectory width information and a sugar color attribute.

The two-dimensional trajectory effect determination unit is configured to determine the two-dimensional trajectory effect based on the trajectory width information, the sugar color attribute and the motion trajectory.

Optionally, the trajectory attribute determination unit is configured to determine the attribute of the trajectory by a method as follows: pause duration of a current pause point is determined, and trajectory width information and a sugar color attribute of the current pause point are determined; according to displacement information and motion duration information from the current pause point to a next pause point, trajectory width information, sugar color depth information, sugar color brightness information and a sugar material thickness between the current pause point and the next pause point are determined as the trajectory attributes.

Optionally, the two-dimensional trajectory determination module 320 is configured to display the two-dimensional trajectory effect by a method as follows: the guide diagram is displayed on a non-entry layer, the two-dimensional trajectory effect drawn is displayed on an entry layer, and the two-dimensional trajectory effect is displayed and the guide diagram is deleted under the condition of detecting that the three-dimensional display condition is satisfied.

Based on the technical solutions above, the three-dimensional display condition includes at least one of the following: duration of drawing the two-dimensional trajectory effect reaches preset drawing duration; completion of drawing of the two-dimensional trajectory effect is detected; and actual stay duration at a pause point reaches a preset stay duration threshold during drawing of the two-dimensional trajectory effect.

Based on the technical solutions above, the apparatus for processing an effect video further includes a target support effect addition module.

The target support effect addition module is configured to update the two-dimensional trajectory effect by adding a target support effect to the two-dimensional trajectory effect.

Based on the technical solutions above, the apparatus for processing an effect video further includes a festival effect superimposing module.

The festival effect superimposing module is configured to superimpose a festival effect onto a target area of a display interface.

Optionally, the video display module 330 is configured to display the three-dimensional trajectory view by a method as follows: the three-dimensional trajectory effect is shot by adjusting a shoot angle of a virtual camera, and three-dimensional trajectory views from a plurality of shoot angles are obtained, where the three-dimensional trajectory effect is determined based on data of the two-dimensional trajectory effect; and the three-dimensional trajectory views are sequentially displayed on the display interface and three-dimensional trajectory views from a plurality of visual angles are obtained.

According to the technical solution of this example, the current position information of the target touch point is obtained in response to the effect triggering operation, that is, a position of the touch point corresponding to the effect prop is determined when the user uses the effect prop. According to the current position information and the drawing parameter, the two-dimensional trajectory effect consistent with the motion trajectory of the target touch point is determined, that is, the effect material corresponding to the effect prop is determined, and the corresponding two-dimensional effect is drawn based on the motion trajectory of the touch point. In response to detecting that the three-dimensional display condition is satisfied, the three-dimensional trajectory effect that corresponds to the two-dimensional trajectory effect is displayed from the plurality of angles, and the three-dimensional trajectory effect is kept displayed until the instruction to stop playing the effect video is detected. In the process of generating the effect video, the prop for drawing the trajectory effect based on the specific material is provided for the user, the demand from the user for simulating the process of drawing the pattern with the specific material in the real world is satisfied, the use experience of the user is improved, and richness and interest of the effect video generated are enhanced.

The apparatus for processing an effect video according to the example of the disclosure may execute the method for processing an effect video according to any example of the disclosure, and has corresponding functional modules and beneficial effects for executing the method.

It is worth noting that all the units and modules included in the apparatus above are merely divided according to a functional logic, but are not limited to the above division, as long as the corresponding functions may be performed. In addition, names of the functional units are merely for the convenience of mutual distinguishing.

Example 4

Figure 7:
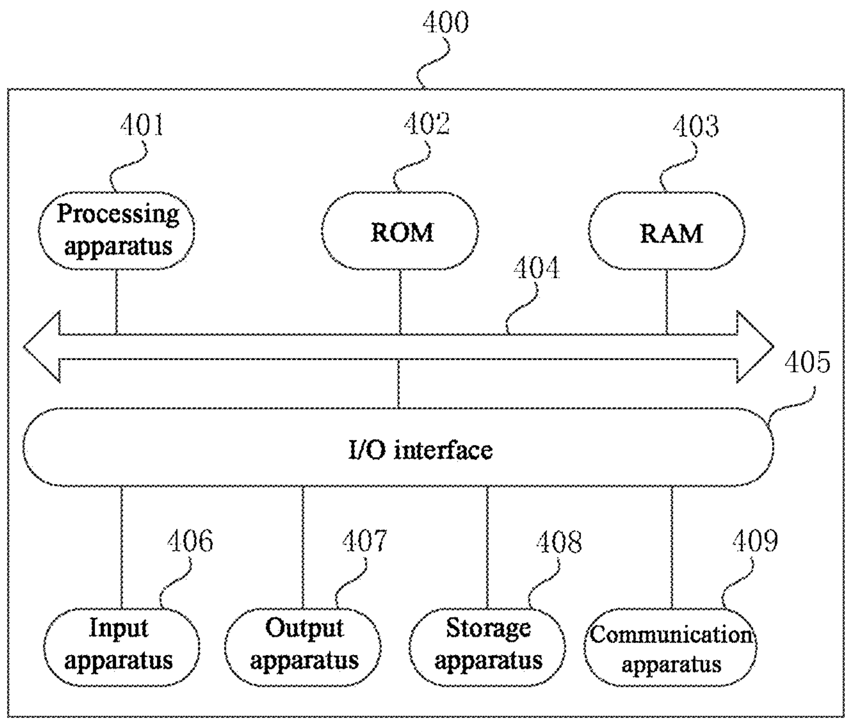
FIG. 7 is an illustrative structural diagram of an electronic device according to Example 4 of the disclosure.

FIG. 7 is an illustrative structural diagram of an electronic device according to Example 4 of the disclosure. With reference to FIG. 7, an illustrative structural diagram of an electronic device 400 (for example, a terminal device or a server in FIG. 7) applied to implementation of the example of the disclosure is shown. The terminal device in the example of the disclosure may include a mobile terminal such as a mobile phone, a laptop, a digital broadcast receiver, a personal digital assistant (PDA), a portable android device (PAD), a portable media player (PMP) and a vehicle-mounted terminal (such as a vehicle-mounted navigation terminal), and a fixed terminal such as a digital television (Digital TV) and a desktop computer. The electronic device shown in FIG. 7 is merely one example.

As shown in FIG. 7, the electronic device 400 may include a processing apparatus 401 (including a central processing unit, a graphics processing unit, etc.) that may execute various appropriate actions and processing according to a program stored in a read-only memory (ROM) 402 or a program loaded from a storage apparatus 408 to a random access memory (RAM) 403. The RAM 403 may further store various programs and data required for the operation of the electronic device 400. The processing apparatus 401, the ROM 402 and the RAM 403 are connected to one another through a bus 404. An input/output (I/O) interface 405 is also connected to the bus 404.

Generally, the following apparatuses may be connected to the I/O interface 405: an input apparatus 406 including, for example, a touch screen, a touch pad, a keyboard, a mouse, a camera, a microphone, an accelerometer and a gyroscope, an output apparatus 407 including, for example, a liquid crystal display (LCD), a speaker and a vibrator, the storage apparatus 408 including, for example, a magnetic tape and a hard disk, and a communication apparatus 409. The communication apparatus 409 may allow the electronic device 400 to be in wireless or wired communication with other devices for data exchange. Although the electronic device 400 having various apparatuses is shown in FIG. 7, it should be understood that all the apparatuses shown are not required to be implemented or provided. More or fewer apparatuses may be alternatively implemented or provided.

According to the example of the disclosure, a process described above with reference to the flowchart may be implemented as a computer software program in an example. For example, the example of the disclosure includes a computer program product. The computer program product includes a computer program carried on a non-transient computer-readable medium, and the computer program includes program codes for executing the method shown in the flowchart. In such an example, the computer program may be downloaded and mounted from the network through the communication apparatus 409, or mounted from the storage apparatus 408, or mounted from the ROM 402. When executed by the processing apparatus 401, the computer program executes the above functions defined in the method according to the example of the disclosure.

Names of messages or information exchanged among a plurality of apparatuses in the embodiment of the disclosure are merely used for illustration rather than limitation to the scope of the messages or information.

The electronic device according to the example of the disclosure belongs to the same inventive concept as the method for processing an effect video according to the above example, reference can be made to the above example for the technical details not described in detail in this example, and this example has the same beneficial effects as the above example.

Example 5

An example of the disclosure provides a computer storage medium. The computer storage medium stores a computer program, where the computer program implements the method for processing an effect video according to the above example when executed by a processor.

It should be noted that the computer-readable medium described above in the disclosure may be a computer-readable signal medium or a computer-readable storage medium or their combinations. The computer-readable storage medium may be, for example, an electric, magnetic, optical, electromagnetic, infrared, or semiconductor system, apparatus or device, or their combinations. More specific examples of the computer-readable storage medium may include: an electrical connection with at least one wire, a portable computer disk, a hard disk, an RAM, an ROM, an erasable programmable read only memory (EPROM or a flash memory), an optical fiber, a portable compact disc-read only memory (CD-ROM), an optical storage device, a magnetic storage device, or their suitable combinations. In the disclosure, the computer-readable storage medium may be any tangible medium including or storing a program, and the program may be used by or in combination with an instruction execution system, apparatus or device. In the disclosure, the computer-readable signal medium may include a data signal propagated in a baseband or as part of a carrier wave, in which a computer-readable program code is carried. This propagated data signal may have many forms, including an electromagnetic signal, an optical signal or their suitable combinations. The computer-readable signal medium may further be any computer-readable medium other than the computer-readable storage medium, and the computer-readable medium may send, propagate or transmit a program used by or in combination with the instruction execution system, apparatus or device. The program code included in the computer-readable medium may be transmitted by any suitable medium, including a wire, an optical cable, a radio frequency (RF), etc., or their suitable combinations.

In some embodiments, a client and a server may communicate by using any network protocol such as the hyper text transfer protocol (HTTP) that is currently known or will be developed in future, and may be interconnected to digital data communication in any form or medium (for example, a communication network). Examples of the communication network include a local area network (LAN), a wide area network (WAN), internet work (for example, the Internet), an end-to-end network (for example, adhoc end-to-end network), and any network that is currently known or will be developed in future.

The computer-readable medium may be included in the electronic device, or exist independently without being fitted into the electronic device.

The computer-readable medium carries at least one program, and when executed by the electronic device, the at least one program causes the electronic device to perform as follows:

obtain current position information of a target touch point in response to an effect triggering operation;

determine, according to the current position information and a drawing parameter, a two-dimensional trajectory effect consistent with a motion trajectory of the target touch point; and display, in response to detecting that a three-dimensional display condition is satisfied, a three-dimensional trajectory effect that corresponds to the two-dimensional trajectory effect from a plurality of angles, and stop displaying the three-dimensional trajectory effect upon the detection of an instruction to stop playing the effect video being satisfied.

Computer program codes for executing the operations of the disclosure may be written in one or more programming languages or their combinations, and the programming languages include object-oriented programming languages including Java, Smalltalk,++, and further include conventional procedural programming languages including "C" language or similar programming languages. The program codes may be completely executed on a computer of the user, partially executed on the computer of the user, executed as an independent software package, partially executed on the computer of the user and a remote computer separately, or completely executed on the remote computer or the server. In the case of involving the remote computer, the remote computer may be connected to the computer of the user through any type of network, including a local area network (LAN) or a wide area network (WAN), or may be connected to an external computer (for example, through the Internet provided by an Internet service provider).

The flowcharts and block diagrams in the accompanying drawings illustrate the architectures, functions and operations that may be implemented by the systems, the methods and the computer program products according to various examples of the disclosure. In this regard, each block in the flowchart or block diagram may represent one module, one program segment, or a part of codes that includes at least one executable instruction for implementing specified logical functions. It should also be noted that in some alternative implementations, the functions noted in the blocks may occur in an order different than those noted in the accompanying drawings. For example, two blocks represented in succession may actually be executed in substantially parallel, and may sometimes be executed in a reverse order depending on the functions involved. It should also be noted that each block in the block diagram and/or flowchart, and a combination of blocks in the block diagram and/or flowchart may be implemented by an application-specific hardware-based system that executes specified functions or operations, or may be implemented by a combination of application-specific hardware and computer instructions.

The units involved in the example of the disclosure may be implemented by software or hardware. A name of the unit does not constitute limitation to the unit itself in some cases. For example, a first obtainment unit may also be described as "a unit that obtains at least two Internet protocol addresses".

The functions described above herein may be executed at least in part by at least one hardware logic component. For example, usable hardware logic components of demonstration types include a field programmable gate array (FPGA), an application specific integrated circuit (ASIC), application specific standard parts (ASSP), a system on chip (SOC), a complex programmable logic device (CPLD), etc.

In the context of the disclosure, a machine-readable medium may be a tangible medium, and may include or store a program that is used by or in combination with the instruction execution system, apparatus or device. The machine-readable medium may be a machine-readable signal medium or a machine-readable storage medium. The machine-readable storage medium may include an electric, magnetic, optical, electromagnetic, infrared, or semiconductor system, apparatus or device, or their suitable combinations. The machine-readable storage medium may illustratively includes an electrical connection based on at least one wire, a portable computer disk, a hard disk, a random access memory (RAM), a read-only memory (ROM), an erasable programmable read-only memory (EPROM or a flash memory), an optical fiber, a portable compact disk read-only memory (CD-ROM), an optical storage device, a magnetic storage device, or their suitable combinations.

According to one or more examples of the disclosure, [Instance 1] provides a method for processing an effect video. The method includes:

Current position information of a target touch point is obtained in response to an effect triggering operation;

According to the current position information and a drawing parameter, a two-dimensional trajectory effect consistent with a motion trajectory of the target touch point is determined;

In response to detecting that a three-dimensional display condition is satisfied, a three-dimensional trajectory effect that corresponds to the two-dimensional trajectory effect is displayed from a plurality of angles, and the three-dimensional trajectory effect is kept displayed until an instruction to stop playing the effect video is detected.

According to one or more examples of the disclosure, [Instance 2] provides the method for processing an effect video. The method further includes:

Optionally, a current image acquisition mode is determined, and the current position information of the target touch point is determined according to the current image acquisition mode.

According to one or more examples of the disclosure, [Instance 3] provides the method for processing an effect video. The method further includes:

Optionally, at least one trajectory template to be selected is displayed;

A trajectory template to be selected that is last triggered within preset duration is taken as a target trajectory template, a guide diagram that corresponds to the target trajectory template is displayed on a display interface, and the target touch point is caused to draw, based on the guide diagram, the two-dimensional trajectory effect;

Or, a default trajectory template is taken as a target trajectory template in response to failing to trigger the at least one trajectory template to be selected within preset duration, where the default trajectory template includes a preset trajectory template or a blank trajectory template.

According to one or more example of the disclosure, [Instance 4] provides the method for processing an effect video. The method further includes:

Optionally, a drawing path of the target trajectory template is determined, the guide diagram is generated according to the drawing path, and the guide diagram is displayed on the display interface.

According to one or more examples of the disclosure, [Instance 5] provides the method for processing an effect video. The method further includes:

Optionally, the current image acquisition mode includes a front-facing acquisition mode;

Current position information, in a display interface, of a target key point in a face image is determined in response to detecting that the face image is included in the display interface.

According to one or more examples of the disclosure, [Instance 6] provides the method for processing an effect video. The method further includes:

Optionally, the current image acquisition mode is a rear-facing acquisition mode;

Position information of a pressing point on a display interface is taken as the current position information, and the pressing point is taken as the target touch point.

According to one or more examples of the disclosure, [Instance 7] provides the method for processing an effect video. The method further includes:

Optionally, an effect drawing pen is added to the target touch point, and the two-dimensional trajectory effect is drawn based on the effect drawing pen.

According to one or more examples of the disclosure, [Instance 8] provides the method for processing an effect video. The method further includes:

Optionally, under the condition of detecting that the target touch point moves based on the guide diagram, the two-dimensional trajectory effect is drawn by taking the current position information as a drawing start point and using a sugar painting drawing material as a drawing material.

According to one or more examples of the disclosure, [Instance 9] provides the method for processing an effect video. The method further includes:

Optionally, a motion pause point of the target touch point is determined during motion of the target touch point;

An attribute of a trajectory between two adjacent motion pause points is determined according to pause point attributes of the two adjacent motion pause points, where the pause point attribute includes pause duration, and the attribute of the trajectory includes trajectory width information and a sugar color attribute;

The two-dimensional trajectory effect is determined based on the trajectory width information, the sugar color attribute and the motion trajectory.

According to one or more examples of the disclosure, [Instance 10] provides the method for processing an effect video. The method further includes:

Optionally, pause duration of a current pause point is determined, and trajectory width information and a sugar color attribute of the current pause point are determined;

According to displacement information and motion duration information from the current pause point to a next pause point, trajectory width information, sugar color depth information, sugar color brightness information and a sugar material thickness between the current pause point and the next pause point are determined as the trajectory attributes.

According to one or more examples of the disclosure, [Instance 11] provides the method for processing an effect video. The method further includes:

Optionally, the guide diagram is displayed on a non-entry layer, the two-dimensional trajectory effect drawn is displayed on an entry layer, and the two-dimensional trajectory effect is displayed and the guide diagram is deleted under the condition of detecting that the three-dimensional display condition is satisfied.

According to one or more examples of the disclosure, [Instance 12] provides the method for processing an effect video. The method further includes:

Optionally, the three-dimensional display condition includes at least one of the following:

- duration of drawing the two-dimensional trajectory effect reaches preset drawing duration;
- completion of drawing of the two-dimensional trajectory effect is detected; and
- actual stay duration at a pause point reaches a preset stay duration threshold during drawing of the two-dimensional trajectory effect.

According to one or more examples of the disclosure, [Instance 13] provides the method for processing an effect video. The method further includes:

Optionally, the two-dimensional trajectory effect is updated by adding a target support effect to the two-dimensional trajectory effect.

According to one or more examples of the disclosure, [Instance 14] provides the method for processing an effect video. The method further includes:

Optionally, a festival effect is superimposed onto a target area of a display interface.

According to one or more examples of the disclosure, [Instance 15] provides the method for processing an effect video. The method further includes:

Optionally, the three-dimensional trajectory effect is shot by adjusting a shoot angle of a virtual camera, and three-dimensional trajectory views from a plurality of shoot angles are obtained, where the three-dimensional trajectory effect is determined based on data of the two-dimensional trajectory effect;

The three-dimensional trajectory views are sequentially displayed on the display interface, and three-dimensional trajectory views from a plurality of visual angles are obtained.

According to one or more examples of the disclosure, [Instance 16] provides an apparatus for processing an effect video. The apparatus includes:

- a position information determination module configured to obtain current position information of a target touch point in response to an effect triggering operation;
- a two-dimensional trajectory determination module configured to determine, according to the current position information and a drawing parameter, a two-dimensional trajectory effect consistent with a motion trajectory of the target touch point; and
- a video display module configured to display, in response to detecting that a three-dimensional display condition is satisfied, a three-dimensional trajectory effect that corresponds to the two-dimensional trajectory effect from a plurality of angles, and stop displaying the three-dimensional trajectory effect upon the detection of an instruction to stop playing the effect video being satisfied.

We claim:

1. A method for processing an effect video, comprising:
   - obtaining current position information of a target touch point in response to an effect triggering operation;
   - determining, according to the current position information and a drawing parameter, a two-dimensional trajectory effect consistent with a motion trajectory of the target touch point; and
   - displaying, in response to detecting that a three-dimensional display condition is satisfied, a three-dimensional trajectory effect that corresponds to the two-dimensional trajectory effect from a plurality of angles, and stopping displaying the three-dimensional trajectory effect upon detection of an instruction to stop playing the effect video being satisfied,
   - wherein, before obtaining the current position information of the target touch point, the method further comprises:
     - determining a current image acquisition mode, and determining the current position information of the target touch point according to the current image acquisition mode, wherein the current image acquisition mode is a front-facing acquisition mode or a rear-facing acquisition mode.

2. The method according to claim 1, wherein the method further comprises, before the obtaining current position information of a target touch point:
   - displaying at least one trajectory template to be selected;
   - taking a trajectory template to be selected that is last triggered within preset duration as a target trajectory template, displaying a guide diagram that corresponds to the target trajectory template on a display interface, and causing the target touch point to draw, based on the guide diagram, the two-dimensional trajectory effect; or
   - taking a default trajectory template as the target trajectory template in response to failing to trigger the at least one trajectory template to be selected within preset duration; wherein the default trajectory template comprises a preset trajectory template or a blank trajectory template.

3. The method according to claim 2, wherein the displaying a guide diagram that corresponds to the target trajectory template on a display interface comprises:
   - determining a drawing path of the target trajectory template, generating the guide diagram according to the drawing path, and displaying the guide diagram on the display interface.

4. The method according to claim 1, wherein the current image acquisition mode is the front-facing acquisition mode, and the obtaining current position information of a target touch point comprises:

determining current position information, in a display interface, of a target key point in a face image in response to detecting that the face image is comprised in the display interface.

5. The method according to claim 1, wherein the current image acquisition mode is the rear-facing acquisition mode, the obtaining current position information of a target touch point comprises:

taking position information of a pressing point on a display interface as the current position information, and taking the pressing point as the target touch point.

6. The method according to claim 4, wherein the method further comprises, after the obtaining current position information of a target touch point:

adding an effect drawing pen to the target touch point, and drawing the two-dimensional trajectory effect based on the effect drawing pen.

7. The method according to claim 2, wherein the determining, according to the current position information and a drawing parameter, a two-dimensional trajectory effect consistent with a motion trajectory of the target touch point comprises:

drawing, under the condition of detecting that the target touch point moves based on the guide diagram, the two-dimensional trajectory effect by taking the current position information as a drawing start point and using a sugar painting drawing material as a drawing material.

8. The method according to claim 7, wherein the drawing the two-dimensional trajectory effect comprises:

determining a motion pause point of the target touch point during motion of the target touch point;

determining an attribute of a trajectory between two adjacent motion pause points according to pause point attributes of the two adjacent motion pause points, wherein the pause point attribute comprises pause duration, and the attribute of the trajectory comprises trajectory width information and a sugar color attribute; and determining the two-dimensional trajectory effect based on the trajectory width information, the sugar color attribute and the motion trajectory.

9. The method according to claim 8, wherein the determining an attribute of a trajectory between two adjacent motion pause points according to pause point attributes of the two adjacent motion pause points comprises:

determining pause duration of a current pause point, and determining trajectory width information and a sugar color attribute of the current pause point; and determining, according to displacement information and motion duration information from the current pause point to a next pause point, trajectory width information, sugar color depth information, sugar color brightness information and a sugar material thickness between the current pause point and the next pause point as the trajectory attributes.

10. The method according to claim 2, wherein the causing the target touch point to draw, based on the guide diagram, the two-dimensional trajectory effect comprises:

displaying the guide diagram on a non-entry layer, displaying, on an entry layer, the two-dimensional trajectory effect drawn, and displaying the two-dimensional trajectory effect and deleting the guide diagram under the condition of detecting that the three-dimensional display condition is satisfied.

11. The method according to claim 1, wherein the three-dimensional display condition comprises at least one of the following:

duration of drawing the two-dimensional trajectory effect reaches preset drawing duration;

completion of drawing of the two-dimensional trajectory effect is detected; and actual stay duration at a pause point reaches a preset stay duration threshold during drawing of the two-dimensional trajectory effect.

12. The method according to claim 1, wherein after it is detected that the three-dimensional display condition is satisfied and before the displaying a three-dimensional trajectory effect that corresponds to the two-dimensional trajectory effect from a plurality of angles, the method further comprises:

updating the two-dimensional trajectory effect by adding a target support effect to the two-dimensional trajectory effect.

13. The method according to claim 12, wherein after the two-dimensional trajectory effect is obtained, the method further comprises:

superimposing a festival effect onto a target area of a display interface.

14. The method according to claim 13, wherein the displaying a three-dimensional trajectory effect that corresponds to the two-dimensional trajectory effect from a plurality of angles comprises:

shooting the three-dimensional trajectory effect by adjusting a shoot angle of a virtual camera, and obtaining three-dimensional trajectory views from a plurality of shoot angles, wherein the three-dimensional trajectory effect is determined based on data of the two-dimensional trajectory effect; and sequentially displaying the three-dimensional trajectory views on the display interface, and obtaining three-dimensional trajectory views from a plurality of visual angles.

15. An electronic device, comprising:

a processor; and a storage apparatus configured to store a program, when executed by the processor, causing the processor to:

obtain current position information of a target touch point in response to an effect triggering operation;

determine, according to the current position information and a drawing parameter, a two-dimensional trajectory effect consistent with a motion trajectory of the target touch point; and display, in response to detecting that a three-dimensional display condition is satisfied, a three-dimensional trajectory effect that corresponds to the two-dimensional trajectory effect from a plurality of angles, and stop displaying the three-dimensional trajectory effect upon detection of an instruction to stop playing an effect video being satisfied, wherein, before obtaining the current position information of the target touch point, the program further causes the processor to:

determine a current image acquisition mode, and determine the current position information of the target touch point according to the current image acquisition mode, wherein the current image acquisition mode is a front-facing acquisition mode or a rear-facing acquisition mode.

16. The electronic device of claim 15, wherein before the obtaining current position information of a target touch point, the program further causes the processor to:

display at least one trajectory template to be selected;

take a trajectory template to be selected that is last triggered within preset duration as a target trajectory template, display a guide diagram that corresponds to the target trajectory template on a display interface, and cause the target touch point to draw, based on the guide diagram, the two-dimensional trajectory effect; or take a default trajectory template as the target trajectory template in response to failing to trigger the at least one trajectory template to be selected within preset duration; wherein the default trajectory template comprises a preset trajectory template or a blank trajectory template.

17. The electronic device of claim 16, wherein the program further causes the processor to:

determine a drawing path of the target trajectory template, generating the guide diagram according to the drawing path, and displaying the guide diagram on the display interface.

18. A non-transitory storage medium, comprising computer-executable instructions, wherein the computer-executable instructions, when executed by a computer processor, cause the computer processor to:

obtain current position information of a target touch point in response to an effect triggering operation;

determine, according to the current position information and a drawing parameter, a two-dimensional trajectory effect consistent with a motion trajectory of the target touch point; and display, in response to detecting that a three-dimensional display condition is satisfied, a three-dimensional trajectory effect that corresponds to the two-dimensional trajectory effect from a plurality of angles, and stop displaying the three-dimensional trajectory effect upon detection of an instruction to stop playing an effect video being satisfied, wherein, before obtaining the current position information of the target touch point, the computer-executable instructions further cause the computer processor to:

determine a current image acquisition mode, and determine the current position information of the target touch point according to the current image acquisition mode, wherein the current image acquisition mode is a front-facing acquisition mode or a rear-facing acquisition mode.

* * * * *